(12) United States Patent
Ricard et al.

(10) Patent No.: US 7,983,114 B2
(45) Date of Patent: Jul. 19, 2011

(54) VERTICAL-AXIS TRANSMITTING SONAR ANTENNA THAT CAN BE WOUND ONTO A WINCH

(75) Inventors: Michel Ricard, La Roquette sur Siagne (FR); Vito Suppa, Roquefort les Pins (FR)

(73) Assignee: Thales (FR)

( * ) Notice: Subject to any disclaimer, the term of this patent is extended or adjusted under 35 U.S.C. 154(b) by 148 days.

(21) Appl. No.: 12/338,613

(22) Filed: Dec. 18, 2008

(65) Prior Publication Data

US 2009/0154295 A1 Jun. 18, 2009

(30) Foreign Application Priority Data

Dec. 18, 2007 (FR) ...................................... 07 08832

(51) Int. Cl.
*G01V 1/20* (2006.01)
(52) U.S. Cl. ........................................................ 367/154
(58) Field of Classification Search .................. 367/154, 367/130, 106, 16
See application file for complete search history.

(56) References Cited

U.S. PATENT DOCUMENTS

| 4,404,664 | A | 9/1983 | Zachariadis | |
| 7,209,408 | B1 * | 4/2007 | Stottlemyer et al. | 367/154 |
| 2009/0154295 | A1 * | 6/2009 | Ricard et al. | 367/154 |

FOREIGN PATENT DOCUMENTS

| DE | 19518461 | | 6/1996 |
| FR | 2497370 | | 7/1982 |
| FR | 2729041 | | 7/1996 |
| FR | 0603729 | | 4/2006 |
| FR | 0608998 | | 10/2006 |
| GB | 2170161 | A | 7/1986 |
| WO | WO/2009/077532 | * | 6/2009 |

OTHER PUBLICATIONS

Banerjee, A.K. Deployment control of a caoble connecting a ship to an underwater vehicle' Journal of Guidance and control and Dynamics. vol. 17, No. 6, Nov. 1, 1994, pp. 1327-1332.

* cited by examiner

*Primary Examiner* — Dan Pihulic

(74) *Attorney, Agent, or Firm* — Stroock & Stroock & Lavan LLP

(57) ABSTRACT

Embodiments of the present invention relate to a linear submersible body including a plurality of rigid segments that are articulated and can adopt relative to one another an orientation making it possible to form a rectilinear body, or a curved body of which the radius of curvature is adapted to the drum of the winch onto which it is wound. The segments are associated with couplers and configured so that a vertical rectilinear posture is naturally obtained when the device is totally submerged and towed by the ship, while the curved posture is obtained naturally by the winding of the device onto the winch. Embodiments of the invention apply to the production of linear and vertical transmitting acoustic antennas.

9 Claims, 5 Drawing Sheets

VERTICAL-AXIS TRANSMITTING SONAR ANTENNA THAT CAN BE WOUND ONTO A WINCH

Figure 1:
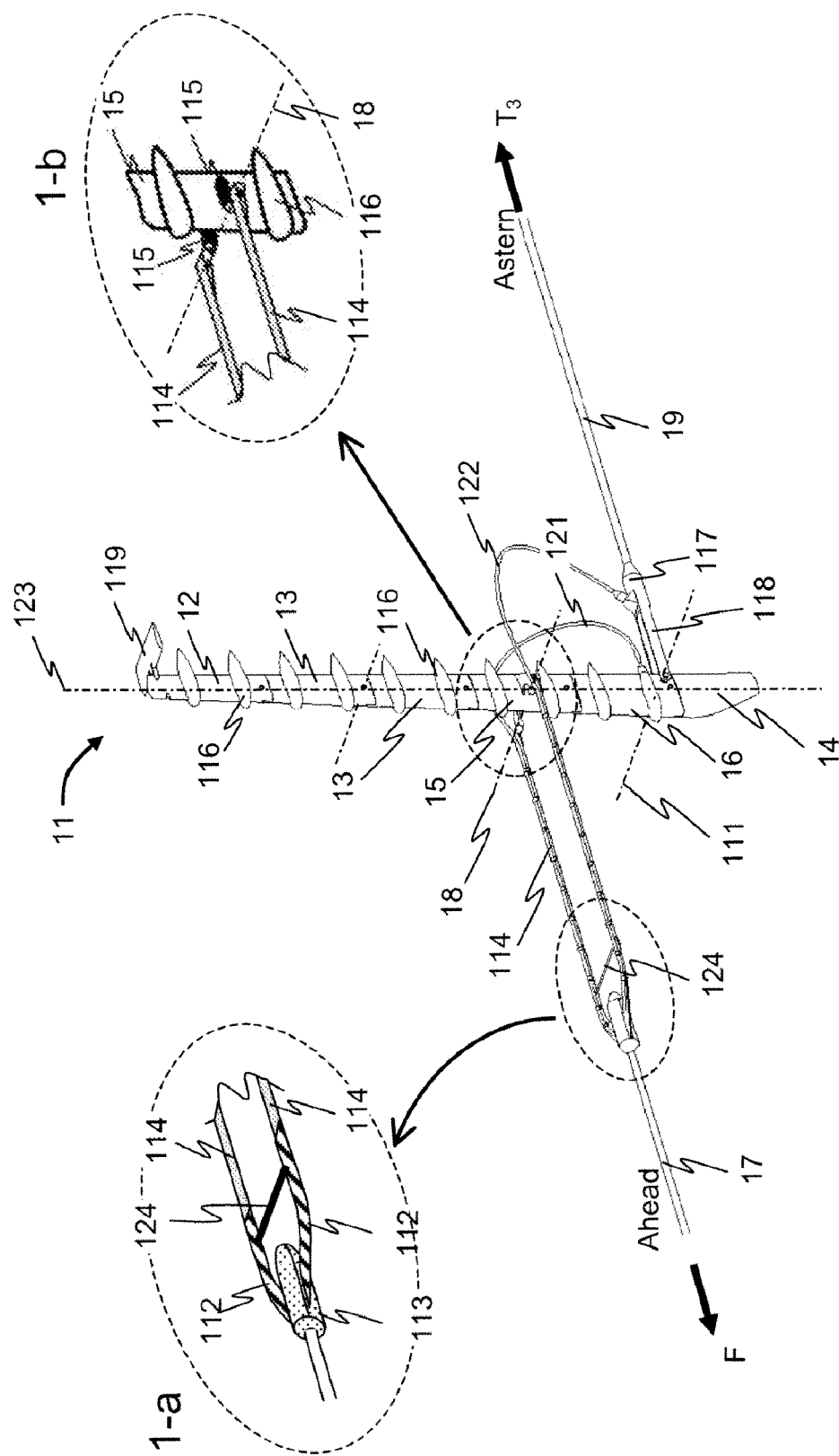

This application claims the benefit of French Application No. 0708832 filed on Dec. 18, 2007, the entire disclosure of which is incorporated by reference in its entirety.

The present invention relates to the general field of undersea mechanics and that of towed linear bodies which are towed in a vertical position and which, at rest, are designed to be stored on the drum of a winch.

More particularly it relates to the transmitting acoustic antennas used in dependent towing with receiving linear acoustic antennas, the receiving antenna being towed by the transmitting antenna in order to form sonar transmit/receive assemblies, and to the problems associated with storing such assemblies on a winch.

The use, from a ship, of an active sonar system, involves placing in the sea and towing a transmitting antenna associated with a receiving antenna, the assembly being supplied and towed at a given distance behind the ship by a towing cable, commonly called an electrotowing cable.

The receiving antenna is usually an elongated antenna of great length with neutral buoyancy, consisting of hydrophones installed in a regular manner in a tubular structure. This type of antenna is commonly called a linear antenna or "streamer". In addition to its acoustic qualities, a linear antenna has the advantage of being able to be handled simply by a winch.

Therefore, during the phase of deploying the sonar, such an antenna is placed in the sea simply by unwinding the winch and allowing the antenna to pay out into the water.

Conversely, during the phase of shutting down the system, the linear antenna is recovered and stored simply by rewinding the antenna onto the winch.

The transmitting antenna, for its part, usually consists of a volume acoustic antenna mounted on a submersible towed body or "fish". Since such an antenna cannot by its nature be stored on a winch, it must be stored independently.

Consequently, the deployment of the complete sonar system is normally carried out by first launching the receiving linear antenna, then connecting the transmitting fish to the as yet unsubmerged end of the linear antenna and to the free end of the electrotowing cable and then unwinding the electrotowing cable so as to allow the towed body to be launched, using for example a derrick or else by having it slide along an inclined plane situated at the stern of the ship.

Conversely, the recovery and storage of the assembly are carried out by rewinding the electrotowing cable onto the storage winch, bringing the fish back on board, uncoupling the fish from the electrotowing cable and from the receiving linear antenna, then coupling the end of the electrotowing cable to the emerged end of the receiving linear antenna. The electrotowing cable and receiving linear antenna assembly is finally stored wound onto the storage winch, while the fish is stored separately on the deck of the ship.

As can be ascertained from its structural heterogeneity, such a system is not very easy to deploy, recover and store. It also requires the intervention of human operators, notably for the various operations of coupling and uncoupling the fish, so that deployment in heavy weather of such an assembly is not only difficult but also potentially dangerous for the physical integrity of the operators.

A known solution for preventing the problems associated with the deployment and recovery of the various elements forming the submerged portion of the sonar consists in developing means making it possible to semiautomatically attach (the mechanical locking remaining manual) the fish to the receiving linear antenna and to the electrotowing cable, and to detach it also semiautomatically. A solution of this type is notably described in French patent application 0608998 filed on 16 Oct. 2006 by the applicant, which proposes a specific means allowing the semiautomatic attachment of the fish to the electrotowing cable and its semiautomatic connection to the electric lines carrying the signals and the power supplies.

Such a solution has the advantage of making it possible to deploy and recover the submerged elements easily in fine weather and acceptably in bad weather because it minimizes the use of human intervention. Conversely, this solution assumes the placement on the ship, close to the location from which the equipment is placed in the sea, of a complex and costly apparatus fairly specifically adapted to a given type of towed body, and a large-dimension opening on the stern plate of the ship. In addition, the reliability of such a semiautomatic electromechanical connection is a technological problem that is awkward to solve.

Another alternative with a towed transmitting body and a receiving linear antenna is of course to tow the two independently, each with its independent towing cable and its independent winch. However, this alternative is much more bulky and costly and is not compatible with small platforms.

Another known solution consists in transmitting the sonar signal with the aid of a linear antenna. This therefore gives a totally linear system consisting of the electrotowing cable, of a transmitting linear antenna and of a receiving linear antenna, still secured to one another, this assembly advantageously being able to be deployed and recovered by a single winch onto which the various elements at rest are wound. However, the use of a transmitting linear antenna poses a certain number of problems in terms of characteristics of the acoustic wave transmitted, in particular in terms of directivity. Specifically, in operation, the transmitting linear antenna is towed substantially horizontally, like the receiving antenna. In this orientation, the transmitting linear antenna comprising hydrophones distributed over the whole of its length has, in a known manner, a natural directivity that is favorable to transmission in a vertical plane which is not naturally suited to the transmission requirement in a horizontal plane.

Consequently, to obtain a correct transmission, the user is forced to install supplementary means.

A first method consists in modifying the transmission diagram of the sound wave, by acting on each hydrophone separately or on determined groups of hydrophones, in order to obtain an omnidirectional and therefore spherical transmission, because it is of revolution about the axis of the antenna. An application of this solution is notably described in French patent application 0603729 filed on 26 Apr. 2006 by the applicant. Such a method however assumes that the user has the necessary number of distinct excitation signals and a large enough number of relatively close transducers.

Another method consists in making arrangements such that, under the effect of the traction exerted by the ship in particular, the transmitting linear antenna is held in a nose-up attitude, as close as possible to the vertical. An application of this solution is notably described in French patent application 9415784 filed on 28 Dec. 1994 by the applicant. Such a solution allows the transmitting antenna to rear up sufficiently close to the vertical only at fairly slow and even very slow towing speeds. Above that speed, the transmitting antenna becomes too tilted with a discoid directivity in a plane orthogonal to the antenna.

Therefore, whichever of the two known technical solutions is adopted to solve the handling problem, it causes resultant problems of which the solution is neither simple nor evident, since these two solutions do not naturally favor the desired directivity for a favored transmission in the horizontal plane.

One object of the invention is to propose a solution for producing a transmitting acoustic antenna that remains vertical when being towed, that is to say in a position that is naturally favorable to an omnidirectional transmission in a horizontal plane and making it possible to have a transmitting acoustic antenna/receiving acoustic antenna assembly that can be easily deployed in the sea and, after use, easily recovered and stored automatically, that is to say without operator intervention. Another object of the invention is for the proposed omnidirectional transmitting acoustic antenna to be able to be stored wound onto the drum of a winch, the same winch as that used to store the electrotowing cable and the receiving antenna, so that the storage of the assembly does not require uncoupling the transmitting acoustic antenna from the receiving acoustic antenna or from the electrotowing cable.

Accordingly, the subject of the invention is a device for producing a towed linear submersible body, capable of adopting a rectilinear configuration in a vertical position when it is towed at a total immersion depth and of adopting a curved configuration at rest, having a radius of curvature allowing it to be wound onto the drum of a winch, characterized in that it includes a set of juxtaposed rigid segments, articulated relative to one another, arranged so that each segment can pivot relative to the adjacent segments between a position for which its axis is colinear with the axis of the considered adjacent segment in a position in which its axis forms a given angle β with the axis of the considered adjacent segment.

According to a preferred embodiment, the device according to the invention includes two particular segments comprising coupling means configured to allow respectively the coupling of a towing cable extending toward the front of the device and a trailing cable extending toward the rear of the device, the anchoring means defining axes about which the body may pivot in a vertical plane passing through the axes of these cables, the two segments being arranged so that, when the body is towed in total submersion, it adopts a vertical rectilinear configuration under the joint action of the traction F exerted by the towing cable, of the traction force exerted by the trailing cable and of the hydrodynamic drag applied by the weight of the water in which it is submerged, and so that, when the body is towed in a totally emerged position, it adopts a rectilinear configuration colinear with the axis of the towing cable.

In this embodiment, the segment connected to the towing cable is associated with a first fastening element comprising a head for fastening the cable, two flat belts and two fastening pins, the fastening head itself comprising a central sleeve onto which the towing cable and two flat and horizontal lateral extensions are inserted. A flat belt is fastened by one of its ends to each of the extensions, the other end of the belt being configured so as to form a loop designed to be threaded onto the corresponding pin of the segment; the pins also being arranged on the body of the segment so as to form colinear axes, advantageously allowing the belts, in operation, to make a pivoting movement about an axis perpendicular to the vertical plane defined by the device when the latter is towed in submersion.

According to this embodiment, the length of the belts is defined so as to allow the portion of the device situated above the axis of rotation to pass to the inside of the arch formed by the extensions and the belts.

According to this embodiment, the segment connected to the trailing cable is associated with a second fastening element comprising a central sleeve onto which the trailing cable and two flat and vertical lateral extensions are inserted whose ends are mounted so as to be able to rotate on the segment so as to allow, in operation, the second fastening element to pivot about an axis parallel to the axis of rotation of the belts of the first fastening element.

According to this embodiment, the length of the extensions is defined so as to form an opening with a length that is substantially equal to that of the portion of the device situated beneath the axis of rotation.

Additionally, the device according to an embodiment of the invention includes a top end segment incorporating a stabilizing aileron and a bottom end segment incorporating a ballast in the form of a keel, these two elements having the function of ensuring the lateral vertical stability of the device in operation.

According to a variant embodiment, the first coupling element includes an intermediate rod connecting the two lateral extensions, the top end segment includes at the zone of contact with the intermediate rod a locking system which traps the rod when the latter makes contact, so that the top portion of the device is then completely secured to the first coupling element.

According to this variant, the lock is released by applying a front-to-back pressure on the stabilizing aileron of the top end segment.

A further object of an embodiment of the invention is the application of the device described above to the production of a transmitting acoustic linear antenna incorporated into a system in which the towing cable is an electrotowing cable and the trailing cable is a cable for towing a receiving linear acoustic antenna, each of the segments comprising a housing containing a hydrophone and its control electronics, the housings being arranged so as to create minimum drag in the direction of movement.

Advantageously, the device according to embodiments of the invention may be deployed and towed in a vertical position irrespective of the depth at which it is submerged and the inclination of the towing cable and of the trailing cable relative to the vertical, and irrespective of the towing speed.

Figure 2:
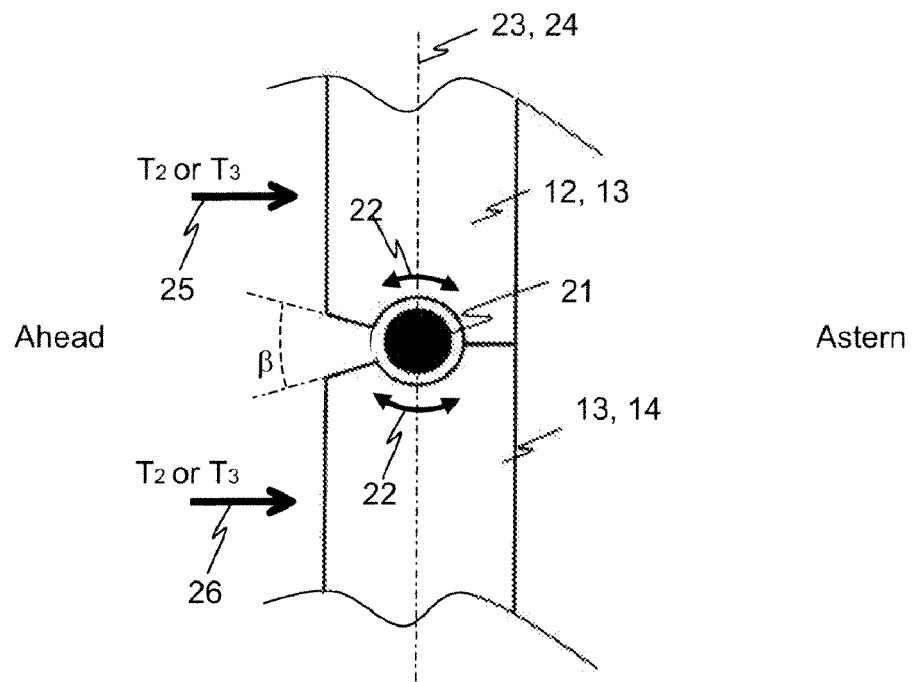
Figure 3:
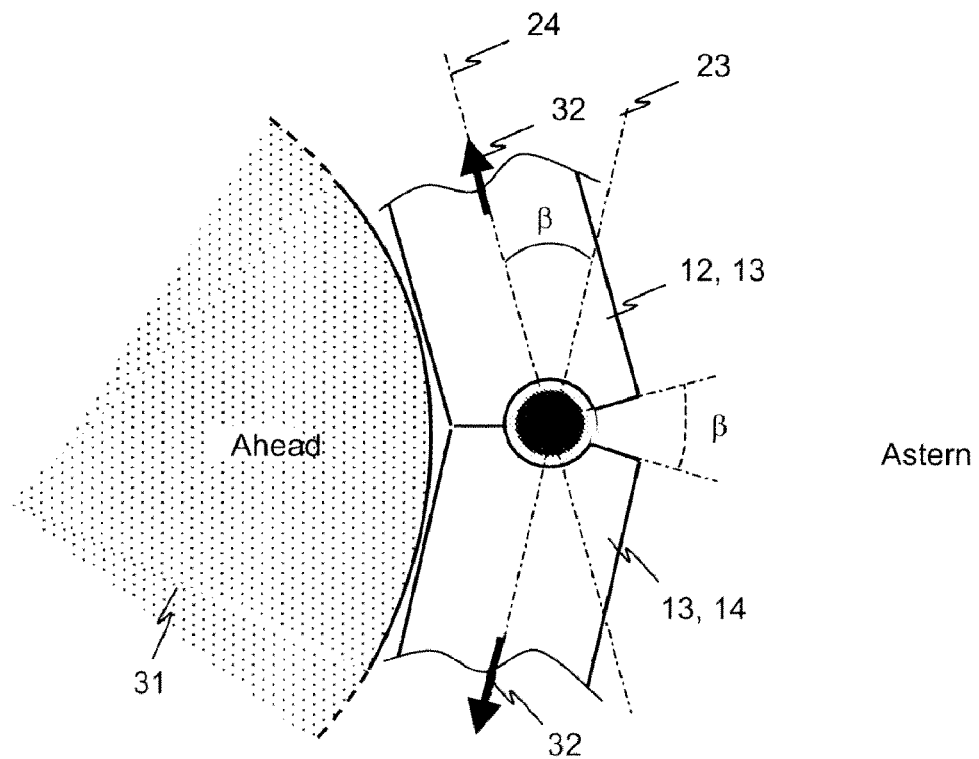
Figure 4:
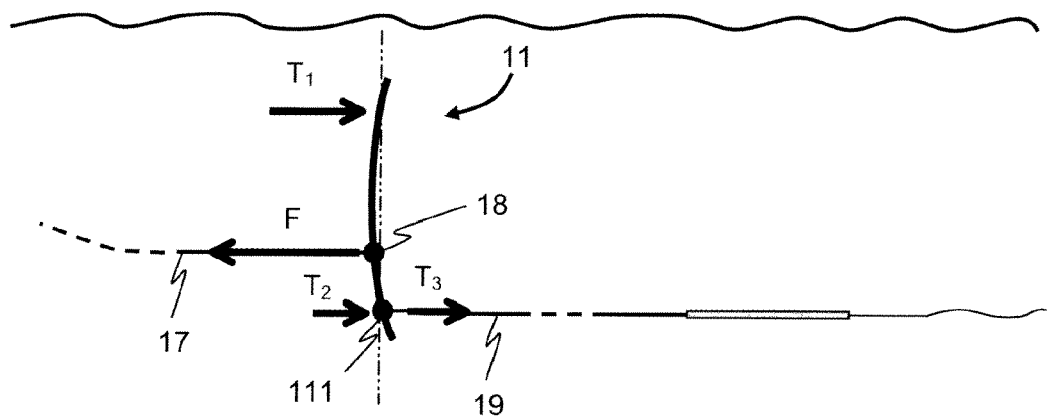
Figure 5:
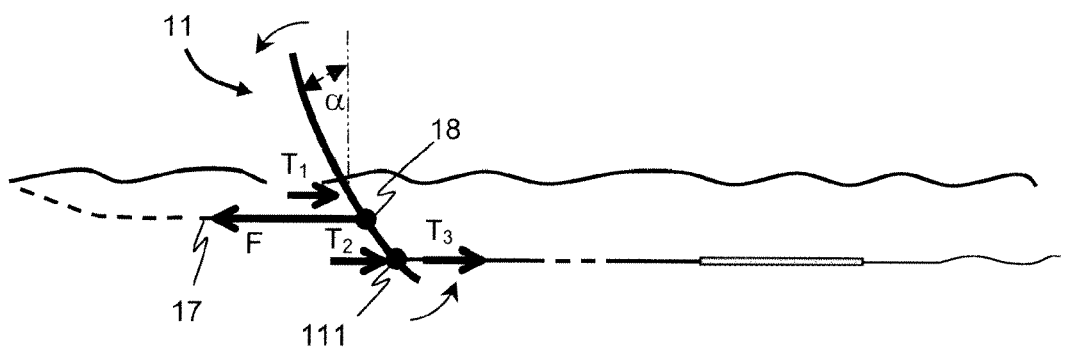
Figure 6:
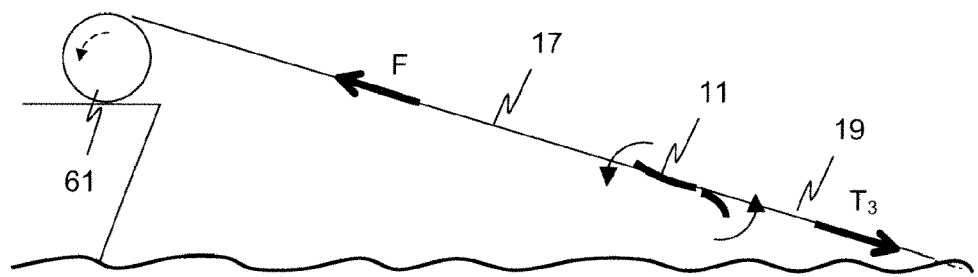
Figure 7:
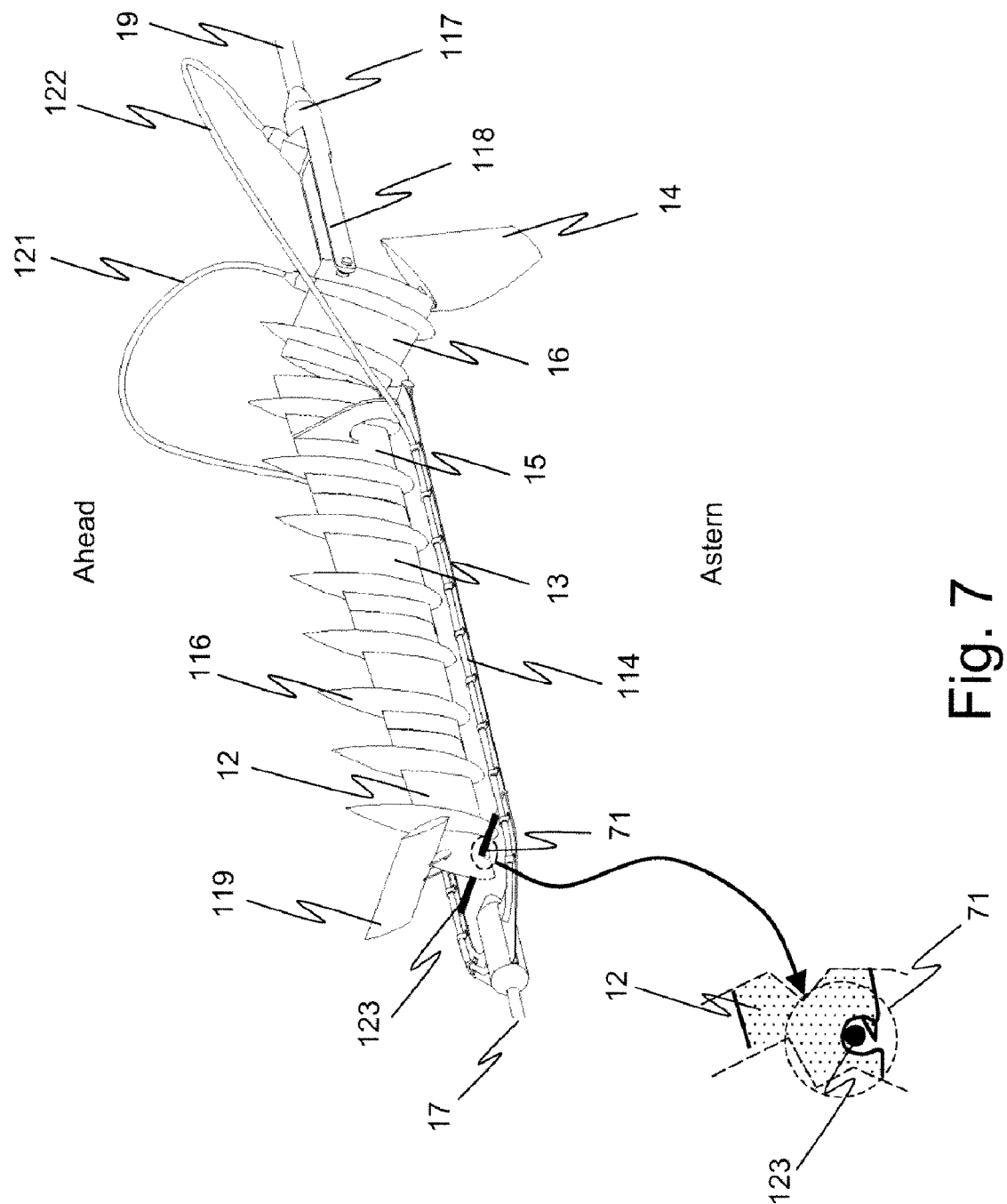
Figure 8:
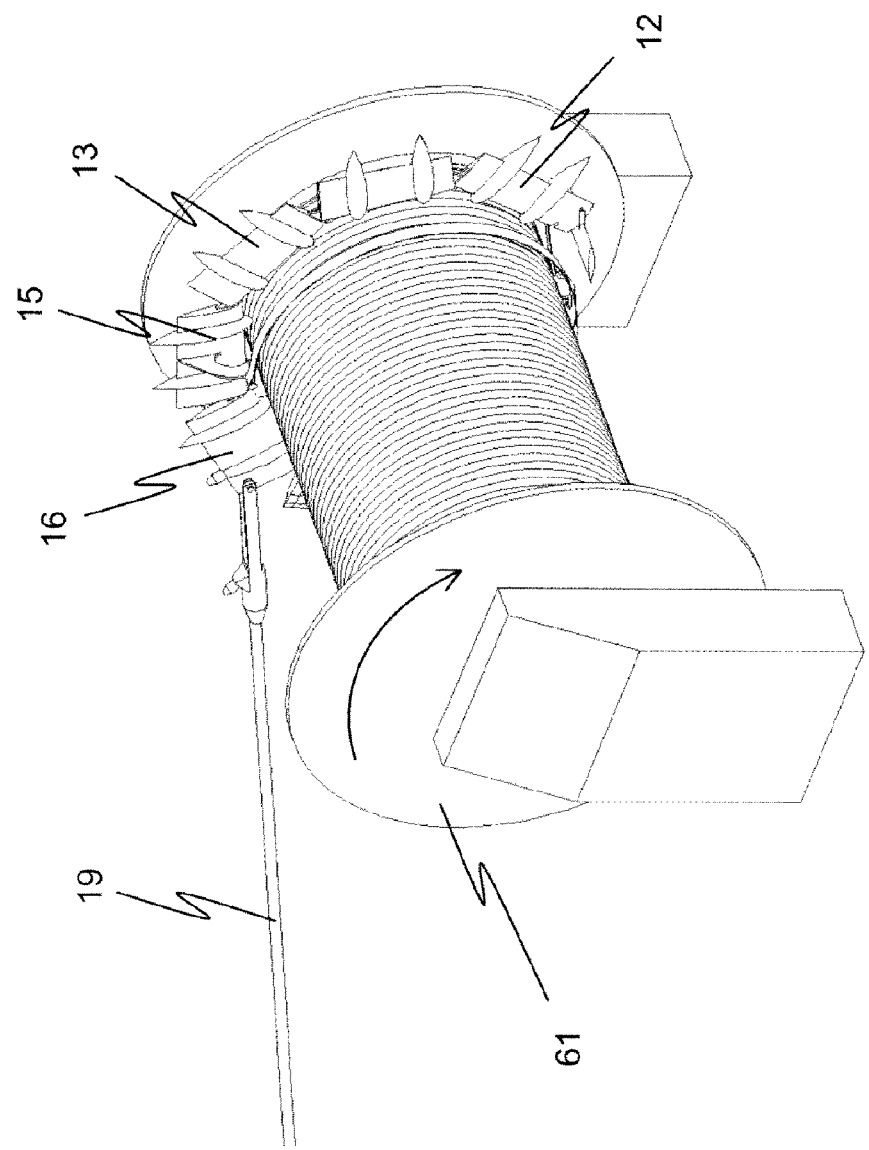

The features and advantages of embodiments of the invention will be better appreciated thanks to the following description, a description which explains the invention through a particular example of application of embodiments of the invention to the production of a vertical-axis transmitting antenna, a nonlimiting example. Furthermore, the following description is based on the appended figures which represent:

FIG. 1, a schematic representation of the device according to an embodiment of the invention applied to the production of a transmitting acoustic antenna;

FIGS. 2 and 3, illustrations showing a structural and functional feature of the device according to an embodiment of the invention, FIGS. 4 to 6, schematic illustrations of the mechanical principle of the device according to an embodiment of the invention;

FIG. 7, an illustration of the mechanism for aligning the device according to an embodiment of the invention during the phase for recovering said device;

FIG. 8, an illustration showing the device according to an embodiment of the invention when it is wound onto the drum of a winch.

The following description sets out the features of the device according to embodiments of the invention in its application to the production of a transmitting acoustic antenna. This particular application makes it possible to bring out the advantageous character of the invention in general. The advantageous character of the device arises mainly from the fact that it is capable, in the phase of operational use, of travelling in towed submersion while remaining in a vertical position, while also being capable in the storage phase of adopting, without damage, a curvature which allows it to be wound onto the drum of a winch.

The features explained here are in no way specific to this particular application and form a preferred part of the invention irrespective of the application in question. Consequently, the device according to embodiments of the invention finds its application in the production of various submerged bodies, for which a constraint of vertical positioning in towed submersion is necessary and for which the problem of simple storage with no manhandling arises.

Reference is made first of all to FIGS. 1 and 2 which provide a general presentation of the device according to embodiments of the invention.

Considering first FIG. 1, which shows the device according to embodiments of the invention in a vertical position, note that the latter includes a thin and hydrodynamic elongated body 11, formed of rigid segments, adjacent central segments 13, extended upward by a first terminal segment 12 and downward by a second terminal segment 14. According to embodiments of the invention, amongst the central segments, two segments 15 and 16 situated in the bottom portion of the body of the device and close to one another, or even touching, are furnished with fastening elements. The segment 15, closest to the mid-portion of the device, is configured so as to allow the fastening of a towing cable 17 to the device, by a first fastening element, a fastening articulated in rotation about a horizontal axis 18 that is substantially perpendicular to the axis of the cable 17. The segment 16 situated beneath the segment 15 is configured so as to allow the fastening of a trailing cable 19 to the device, a fastening articulated in rotation about a horizontal axis 111 parallel to the axis 18.

In operation, when the device is submerged and it sustains a determined traction force by the towing cable and a resistant force by the trailing cable 19, the latter adopts a vertical posture similar to that of FIG. 1, the first and the second fastening element being, for their part, in a substantially horizontal position, respectively in the extension of the towing cable 17 and the trailing cable 19, a cable which may also be used to tow another object behind the device.

According to embodiments of the invention, the form, the structure and the materials constituting the device are defined so as to satisfy the following criteria:

have dimensions, an overall volume, making it possible to house the elements that are to be incorporated into the device,
have a structure naturally helping, in submersion, retention in the vertical position,
having a neutral buoyancy, so that maintaining at a given depth requires no force,
having the smallest possible drag, taking account of the dimensions to be observed, so as not to compromise the stability of the vertical position. Accordingly, the device according to embodiments of the invention adopts a hydrodynamic profile.

In the context of the exemplary application chosen as a support for the present description, the illustration of FIG. 1 shows the device according to an embodiment of the invention applied to the production of a transmitting acoustic antenna. The latter, according to the criteria specified above, is an element in which each of the central segments 13 and of the end segments 12 and 14 has a hydrodynamic profile in the shape of a fin, of the NACA type for example, and includes a housing 116 containing a hydrophone and its control electronics. According to an embodiment of the invention, these housings 116 are arranged so as to create minimum drag in the direction of movement. In addition, in this exemplary embodiment, the top segment 12 incorporates an aileron 119, while the bottom segment 14 includes a ballast in the shape of a keel. The incorporation of these additional elements, and the hydrodynamic characteristics conferred by design on the housings 116, notably have the effect of preventing phenomena of roll, of pitch or else of vortical flow and therefore of enhancing the stability of the device relative to the vertical. Furthermore, with the same concern for stability, the antenna is designed based on a device according to embodiments of the invention having an antero-posterior cambering, conferring thereon a slightly bowed profile. This gives a slender antenna, consisting of juxtaposed hydrophones, whose acoustic centers are vertically aligned and of which the operation is similar to that of a transmitting vertical linear antenna. Consequently, through its ability to adopt a vertical orientation in operation, the antenna produced by the application of the device according to embodiments of the invention advantageously makes it possible to generate an omnidirectional transmission in a simple manner.

In this application, the cable 17 is an electrotowing cable whose role as a towing cable is supplemented by the role of electrical supply and signal-transfer cable. In addition, the trailing cable 19 is in this instance used to tow a receiving linear antenna.

Consideration is now given to FIGS. 2 and 3, which illustrate schematically how the various segments constituting the device according to embodiments of the invention are arranged and articulated relative to one another, and the morphological features that allow such an arrangement.

As can be ascertained from FIGS. 2 and 3, the segments constituting the device, both the central segments 13, 15 and 16 and the terminal segments 12 and 14, are articulated relative to one another by axial articulations 21, arranged to allow a rotation of each element in the vertical plane, a rotation symbolized by the arrows 22 in the figure. The amplitude of rotation about the axes of articulation 21 is in this instance limited so that the axis 23 of a segment cannot make, with the axis 24 of an adjacent segment, an angle greater than a given angle β. The rotation also takes place between a position, illustrated by FIG. 2, which, when it is adopted by all the segments, makes it possible to obtain a straight alignment of the assembly, and a position, illustrated by FIG. 3, which affects the assembly with a curvature whose radius is for example adapted to the radius of the drum 31 onto which it is desired to position the device in the storage phase. The device according to embodiments of the invention may therefore advantageously adopt a rectilinear configuration in the operational deployment phase and a curved configuration in the storage phase.

To limit the amplitude of possible rotation, it is possible to use various known articulation. However, an advantageous solution consists in producing a set of contiguous segments and in producing each segment so that each of the top and bottom faces of each segment, faces in contact with the corresponding faces of the adjacent segments, is presented not as a flat surface but on the contrary as a surface formed by the joining of two half-surfaces inclined relative to one another, in the vertical plane, at an angle β/2; the intersection of these two half-surfaces forming a ridge parallel to the axis of rotation of the articulation. Consequently, with such an arrangement, the top and bottom faces of two contiguous segments are never in contact with one another other than by a half-surface, and this occurs irrespective of the relative positions of the segments considered.

Consideration is again given to FIG. 1, in order to pay attention to the fastening segments 15 and 16, and to the associated fastening means, means that form a preferred part of the device according to embodiments of the invention.

As has been said above, the device according to embodiments of the invention is arranged so as to be able to be placed in a vertical position when it is deployed, as illustrated by FIG. 1. Accordingly, the segments 15 and 16 are fitted with fasteners allowing the coupling of the towing cable 17 and of the trailing cable 19 to the device.

The towing cable 17 is coupled to the segment 15 by an element comprising a head for fastening the cable, two flat belts 114 and two fastening pins 115. The fastening head illustrated by the enlarged partial view 1-a of FIG. 1 itself includes a central sleeve 113 onto which the towing cable 17 and two flat and horizontal lateral extensions 112 are inserted. One end of one of the flat belts 114 is fastened to each of the extensions 112, the other end of the belt being configured so as to form a loop designed to be threaded onto the corresponding pin 115, as illustrated in the enlarged partial view 1-b of FIG. 1. The pins 115 are also arranged on the body of the segment 15 so as to form colinear axes, advantageously allowing the belts 114, in operation, to make a pivoting movement about an axis 18 perpendicular to the vertical plane defined by the device 11 when the latter is towed in submersion. This movement makes it possible to prevent the application of too great a torsional stress on the attachment of the towing cable.

According to embodiments of the invention, the length of the belts 114 is defined so that the arch formed by the extensions 112 and the belts 114 has a length that is substantially equal to that of the portion of the device situated above the axis 18 (or in other words so as to allow the portion of the device situated above the axis 18 to pass to the inside of the arch formed by the extensions 112 and the belts 114).

Similarly, the coupling of the trailing cable 19 to the segment 16 is achieved by an element 117 comprising a central sleeve onto which the trailing cable 19 and two flat and vertical lateral extensions 118 are inserted whose ends are mounted so as to be able to rotate on the segment 16, so as to allow, in operation, the element 117 advantageously to pivot about an axis 111 parallel to the axis 18 and to prevent the application of too great a torsional stress to the attachment of the trailing cable.

According to embodiments of the invention, the length of the extensions 118 is defined so as to form an opening with a length that is substantially equal to that of the portion of the device situated beneath the axis 111.

It should be noted that in the particular case of application of the device according to embodiments of the invention to the production of a transmitting acoustic antenna, because the electrotowing cable 17 does not culminate immediately beside the antenna, it is necessary to provide a means for routing the power supplies and electric signals to the transmitting antenna and optionally to the receiving linear antenna situated behind the latter and towed by the trailing cable 19. Accordingly, it is possible, for example, as illustrated in FIG. 1, to use electric cables 121 and 122, exerting no traction force, which travel from the electrotowing cable 17 to the transmitting antenna 11 and the receiving antenna, while being attached to the belts 114.

Consideration is then given to FIGS. 4 to 6 which make it possible to describe the operating principle of the device according to embodiments of the invention through three characteristic dynamic situations, in complete submersion and in the course of being raised back on board while it is still partially submersed, and then when it is completely out of the water.

FIG. 4 illustrates the dynamic behavior of the device 11 according to embodiments of the invention when it is submerged, towed by a ship. F and $T_3$ are the traction forces exerted respectively by the towing cable 17 at the attachment point 41 and by the trailing cable 19 at the attachment point 42. Similarly, $T_1$ and $T_2$ are the forces intended to schematically represent the pressure exerted by the seawater, because of the movement of the device on the two sections of the device situated on either side of the point 41.

According to the embodiments of invention, as has already been said above, the attachment points of the cables 17 and 19 are positioned on segments 15 and 16 located in the bottom portion of the structure 11. They are also arranged so that the distance between the axis 18 forming the zone of attachment of the cable 17 to the device and the axis 111 forming the zone of attachment of the cable 19 is such that, when the device is completely submerged, the pressing forces exerted by the medium hold the various segments in a rectilinear position, the contiguous segments being in contact via the rear half-surfaces of their upper and lower faces, and so that the resultant moment of the pressing forces exerted by the marine medium on the device balances the resultant moment of the traction force exerted by the trailing cable and the force exerted by the towing cable. Consequently, the device being in dynamic balance, it positions itself on a vertical axis under the action of its weight. In other words, the distance between the attachment zones of the cables 17 and 19 and the positioning of these zones over the length of the device is defined so that, when it is towed in submersion, the device according to embodiments of the invention adopts a position of equilibrium that is substantially vertical. These positioning parameters influence the absolute and relative arrangement of the segments 15 and 16 in the device, these segments being able, for example, to represent the penultimate two segments of the chain, placed just above the segment 14 supporting the fin.

FIG. 5 illustrates the dynamic behavior of the device 11 according to embodiments of the invention when it is semisubmerged, still towed by a ship. This situation corresponds to the situation of the device during the phase for recovering the equipment after use. In this phase, the device according to embodiments of the invention moves from the submerged state to the emerged state. It is noted then that, because of the reduced intensity of the pressing forces $T_1$ exerted by the aquatic medium on the device, the device 11 according to the invention adopts a position of equilibrium that is inclined at an angle α relative to the vertical, the value of the angle α increasing the more the device is out of the water. The device according to the invention therefore moves progressively from a vertical position to an inclined position for which the main axis 123 (see FIG. 1) of the device is in line with the axis of the towing cable 17. In parallel, the segments 12, 13, 14, and 16 forming the device according to the invention are held more loosely in a rectilinear alignment.

Finally, FIG. 6 shows the device according to the invention in the completely emerged position while it is pulled by the winch of the ship in order to be brought on board. In this situation, which follows that of partial submersion, the trailing cable and the object that may be towed, a receiving linear acoustic antenna for example, are still submerged and still exert traction on the device. Consequently, now being subjected only to the traction forces F and $T_3$, the main axis 122 of the device according to the invention aligns itself with the axes of the cables 17 and 19 until it is stored on the drum of the winch. No longer does any force then hold the various segments 12, 13, 14, 15 and 16 forming the device according to the invention in an aligned position. The ballast which hangs down confers a stable position preventing gyration about the axis of the cable in this airborne phase.

Consideration is then given to FIG. 7, which shows the device according to embodiments of the invention in the attitude that it occupies when it is pulled out of the water in the position illustrated by FIG. 6 for example.

When the device according to embodiments of the invention emerges completely from the water, it is subjected to two opposing forces the action of which results in a rotation of its upper portion, situated above the axis 18, which brings the top end segment 12 into contact with the intermediate rod 124 which connects the two extensions 112 of the coupling element of the towing cable 17. The segment 12 includes, at the zone of contact, a locking system 71 which traps the rod 124 when it comes into contact, so that the upper portion of the device is completely secured to the coupling element of the towing cable 17. According to an advantageous feature of the device according to embodiments of the invention, the lock 71 is released by applying a front-to-back pressure on the stabilizing aileron 119. The lower portion of the device, for its part, in particular the segments 16 and 14, takes an orientation complying with gravity and with the traction exerted by the trailing cable 19.

Attention is now given to FIG. 8 which illustrates how, thanks to the features explained above, the device according to embodiments of the invention may advantageously be wound onto the drum of a winch following the towing cable. Note that, in the wound position, the various segments of the antenna developed from the device according to embodiments of the invention are positioned on the winch so that the profile of the antenna follows the curvature of the drum of the winch. The elements 118 and 117 rest on the segment 14 comprising the ballast (i.e. the keel) while keeping it pressed onto the cable drum while it rotates.

With reference to the application of the device according to embodiments of the invention to the production of a transmitting acoustic antenna, the antenna being followed by a receiving linear antenna, the winch 61 is designed in order to allow the storage of all the elements placed in the sea, namely the electrotowing cable 17, the transmitting antenna 11 according to embodiments of the invention, the trailing cable 19 and the receiving linear antenna. It is therefore possible advantageously to deploy and store both antennas of the system without carrying out any coupling and uncoupling operation.

With reference to the sea launch and deployment of the device according to embodiments of the invention, this operation, carried out by unwinding the winch 61, naturally includes the following phases:

a first phase during which the device is in the completely emerged position and maintains a position identical to that shown in FIG. 6 relative to the cables 17 and 19;

a second phase during which the device enters the water, a phase during which it is partially submerged and held in the axis of the cables by the locking device 71, despite the creation of pressing forces associated with the movement in the water of the submerged portion of the device. The device according to embodiments of the invention therefore enters the water in the alignment of the towing cable 17 and trailing cable 19.

a final phase which begins with the complete submersion of the device and the release of the locking device 71 by the application, by the weight of the water, of a pressing force on the stabilizing aileron 119, a pressing force which has the effect of tilting the aileron into a horizontal position, a movement which releases the lock 71. The device then freed tilts into a vertical position.

The invention claimed is:

1. A device for producing a towed linear submersible body, capable of adopting and keeping a rectilinear configuration in a vertical position even at high tow-speed, when it is towed at a total immersion depth and of adopting a curved configuration at rest, having a radius of curvature allowing it to be wound onto the drum of a winch, the device comprising:

a plurality of juxtaposed rigid segments, articulated relative to one another, arranged so that at least a first rigid segment can pivot relative to an adjacent second rigid segment, between a first position and a second position, the first position being configured such that an axis of the first rigid segment is substantially colinear with an axis of the adjacent rigid segment, while the second position is configured such that an axis of the first rigid segment forms a predetermined angle $\beta$ with the axis of the adjacent rigid segment;

the device further comprising a first coupling segment for coupling the device and a towing cable and a second coupling segment for coupling the device and a trailing cable, wherein the first coupling segment and the second coupling segment are arranged along the device and respectively coupled to the towing cable or the trailing cable in such a way that:

when the submersible body is towed in total submersion, the submersible body adopts a vertical rectilinear configuration under joint action of a first traction force exerted by the towing cable, a second traction force exerted by the trailing cable and a hydrodynamic drag applied by the water mass in which the submersible body is submerged; and when the submersible body is towed in a totally emerged position, the submersible body adopts a rectilinear configuration substantially colinear with the axis of the towing cable.

2. The device as claimed in claim 1, further comprising:

a first fastening pin, attached to the first coupling segment, configured to allow pivotable coupling of the towing cable extending toward a front of the device, the first fastening pin defining a first pivot axis about which the first coupling segment may pivot in a vertical plane passing through an axis of the towing cable; and a second fastening pin, attached to the second coupling segment, configured to allow pivotable coupling of the trailing cable extending toward a rear of the device, the second fastening pin defining a second pivot axis about which the second coupling segment may pivot in a vertical plane passing through an axis of the trailing cable, wherein the first fastening pin and the second fastening pin provide an anchoring means defining the first pivot axis and the second pivot axis.

3. The device as claimed in claim 2, wherein the first coupling segment engages with a first fastening element, the first fastening element comprising:

a fastening head to fasten the towing cable, wherein the fastening head comprises:

a first central sleeve surrounding the towing cable;

a first flat lateral extension, inserted into a first side of the first central sleeve; and a second flat lateral extension, inserted into a second side of the first central sleeve, approximately opposite from the first side;

a first flat belt, having a proximate end fastened to the first lateral extension, and having a distal end configured to form a loop attached to the first fastening pin;

a second flat belt, having a proximate end fastened to the second lateral extension, and having a distal end configured to form a loop attached to the second fastening pin, wherein the belts are configured to allow a pivoting movement about the first pivot axis perpendicular to the vertical plane defined by the device when the device is towed in submersion.

4. The device as claimed in claim 3, wherein the first flat belt and the second flat belt are configured to allow the portion of the device situated above the first pivot axis to pass to the inside of an arch formed by the first lateral extension, the second lateral extension, the first flat belt and the second flat belt.

5. The device as claimed in claim 2, wherein the second coupling segment engages with a second fastening element, the second fastening element comprising:

a second central sleeve surrounding the trailing cable;

a third flat lateral extension, inserted into a first side of the first central sleeve; and a fourth flat lateral extension, inserted into a second side of the second central sleeve, approximately opposite from the first side, wherein the belts are mounted to the second coupling segment to allow the second fastening element to pivot about a third pivot axis substantially parallel to the first pivot axis and the second pivot axis.

6. The device as claimed in claim 5, wherein the third lateral extension and the fourth lateral extension form an opening with a length that is substantially equal to a portion of the device situated beneath the third pivot axis.

7. The device of claim 1, wherein the device further comprises:

a top end segment comprising a stabilizing aileron; and a bottom end segment comprising a ballast in the form of a keel, wherein the top end segment and the bottom end segment provide lateral vertical stability of the device in operation.

8. The device of claim 3, wherein the first coupling segment further comprises:

an intermediate rod connecting the first flat lateral extension and the second flat lateral extension, the intermediate rod configured to engage at a zone of contact with a lock formed on a top end segment, wherein the top end segment is secured to the first coupling element after engagement.

9. The device as claimed in claim 8, wherein the lock is released by applying a front-to-back pressure on a stabilizing aileron of the top end segment.

* * * * *